United States Patent [19]

Tann

[11] 4,270,791
[45] Jun. 2, 1981

[54] EXPANSIBLE ENCLOSURE

[76] Inventor: Robert L. Tann, 4 Colony Blvd., Apt. 406, Wilmington, Del. 19802

[21] Appl. No.: 954,529

[22] Filed: Oct. 25, 1978

[51] Int. Cl.³ .............................................. B60P 3/32
[52] U.S. Cl. ...................................... 296/171; 52/67; 296/27; 296/173
[58] Field of Search ................... 296/26, 27, 171, 172, 296/173, 175, 176; 52/67, 68, 70, 71

[56] References Cited
U.S. PATENT DOCUMENTS 3,815,949   6/1974   Ulert ........................................ 52/67

Primary Examiner—John J. Love
Assistant Examiner—John A. Carroll

[57] ABSTRACT

An expansible enclosure, suitable for use as a camper, trailer, display booth or display counter, having a box-like structure with six sides mutually interconnected at their respective peripheries, with telescoping frame facilities for expanding and contracting the enclosure by varying the distance between opposed sides, allowing expansion and contraction in three dimensions while maintaining substantial rigidity and integrity of the enclosure.

8 Claims, 8 Drawing Figures

EXPANSIBLE ENCLOSURE

BACKGROUND OF THE INVENTION

This invention relates to enclosure apparatus which can be expanded or contracted to various dimensions. It relates particularly to expansible mobile trailers which can be readily transported from one site to another. With the present invention, if utilized as an expansible mobile home, camper or work trailer, it can be contracted such that it is of moderate size and easily transportable from location to location, and then expanded in height, width and length to provide a relatively spacious and commodious mobile home, camper or work trailer.

DESCRIPTION OF THE PRIOR ART

In attempting to design trailers and other forms of apparatus which are expansible, a number of approaches have been used. A common method has been to raise and lower trailers from a stored or towing position to a usable position by drums around which cables are wound, the cables being rooted to the upper portion of the trailer to raise and lower the trailer. Other references have shown different facilities such as interfitting wall portions to allow the interior dimensions of a trailer to be changed. For example, U.S. Pat. No. 2,767,013, to Spears, shows a trailer having a top which can be elevated wherein the top is mounted on a single telescoping central member. As an example of an expansible house trailer, U.S. Pat. No. 3,234,697, to Spencer, shows a vehicle that may be collapsed for transport and then substantially expanded by folding out various wall sections. U.S. Pat. No. 3,212,810, to Bass, also discloses a collapsible trailer of the house trailer type wherein a plurality of sections may be expanded by longitudinally telescoping means to provide a substantially elongated vehicle. Another example of expansible trailer construction is shown in U.S Pat. No. 3,734,559, to Touchette. This reference shows a trailer which expands vertically using cable and winch-operated interfitting wall sections. The elevating mechanism in this reference uses a system of pulleys and cables sometimes located within vertical channels which extend upwardly to form part of the walls of the trailer. Supplementary guide members are used to maintain integrity of the expansible portions. U.S. Pat. No. 3,815,949, to Ulert, also discloses an expansible mobile apparatus which uses interfitting floor, roof and wall sections and additional interfitting floor, roof and wall sections, which move relatively to one another for changing the dimensions of the apparatus. The specification shows interfitting body members which are actuated by hydraulic means to alter the dimensions of the apparatus.

Although the prior art does disclose the concept of a trailer having telescoping major body parts, none of the references discloses in combination substantially parallel and perpendicular telescoping structural elements which will expand in two or three dimensions to form the frame of an enclosure. In addition, none of the references demonstrates the kind of structural rigidity necessary for a vehicle or apparatus which must withstand the forces of weather and transport and the stresses associated therewith. A further disadvantage of many other prior art systems includes the lack of an effective means for guiding an upper portion of a trailer onto the lower portion and in sealing the two portions to prevent the ingress of wind, dust, moisture or the like.

SUMMARY OF THE INVENTION

The present invention recognizes and overcomes many of the problems encountered by the prior art in attempting to provide a utilitarian transportable expansible booth type apparatus which may be quickly changed in dimensions and effectively transported, if desired, from location to location while still maintaining sufficient structural integrity to fulfill its intended function. The expansible enclosure apparatus of this invention includes a box-like structure having six sides interconnected at their respective peripheries, the sides arranged in opposed pairs, at least two of the pairs of opposed sides being expansible; and at least two telescoping frame members, the frame members being perpendicular to each other, and each of the frame members being integral and co-planar with an expansible side of said box-like structure, each of the frame members interconnecting a pair of opposed sides, each of the frame members telescoping to move their respective pair of opposed sides, interconnected by the frame members, toward and away from each other for varying the dimensions of the enclosure in two dimensions.

It is an object of this invention to provide an expansible apparatus which may be readily and economically manufactured and which is relatively simple in construction and light in weight for use as a trailer display booth, camper or display counter.

A further object of this invention is to provide a box-like enclosure whose overall dimensions can be infinitely varied while maintaining substantial rigidity and integrity.

A still further object of this invention is to provide an enclosure that can be expanded and retracted simply and quickly while maintaining maximum flexibility.

Another object of this invention is to provide an expansible apparatus which can be fitted with side portions such that the ingress of wind, dust, moisture and debris can be substantially minimized.

Yet another object of this invention is to provide an expansible apparatus which can be operated by cable, hydraulic or other motive means.

DESCRIPTION OF THE INVENTION

Figure 1:
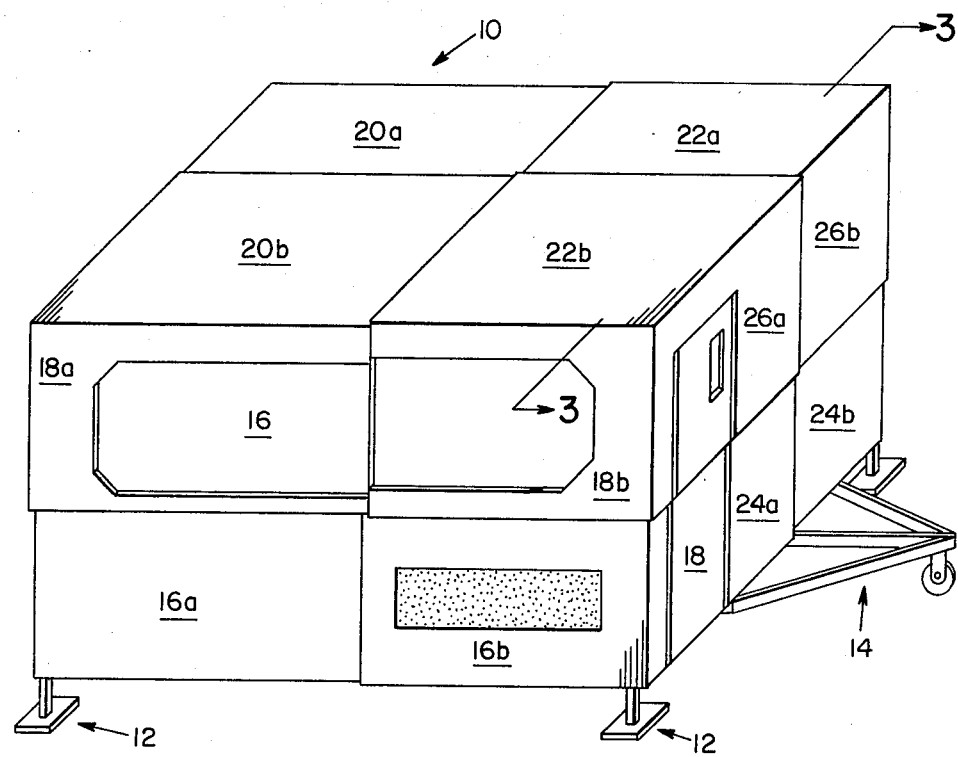
FIG. 1 is a perspective view of an expansible trailer in the open position.

An embodiment of the expansible enclosure of this invention is shown in FIG. 1 in the open position. The expansible enclosure, generally designated as 10, is shown resting on legs 12 which can be removed or retracted when the apparatus is moved. Towing assembly 14 generally allows the apparatus to be attached to another vehicle for movement from place to place.

In this expanded view of the apparatus of this invention, the expansible enclosure is being used as a booth with a window 16 on one side and a door 18 along one of the end sections. A first sidewall 16 includes two interfitting first sidewall panels 16a and 16b, which have corresponding sections on the other, i.e., opposed, side of the apparatus (not shown). Above the interfitting first sidewall panels 16a and 16b are corresponding interfitting second sidewall panels 18a and 18b which constitute a second sidewall 18. Corresponding sections to 18a and 18b (not shown) are located on the other side of the enclosure. In this embodiment, panels 20a and 20b of a first top section are shown along with panels 22a and 22b of a second top section. In this embodiment, the lower end panels are generally designated 24a and 24b and the upper end panels are generally designated 26a and 26b. Corresponding panels are included on the opposing panel.

Figure 2:
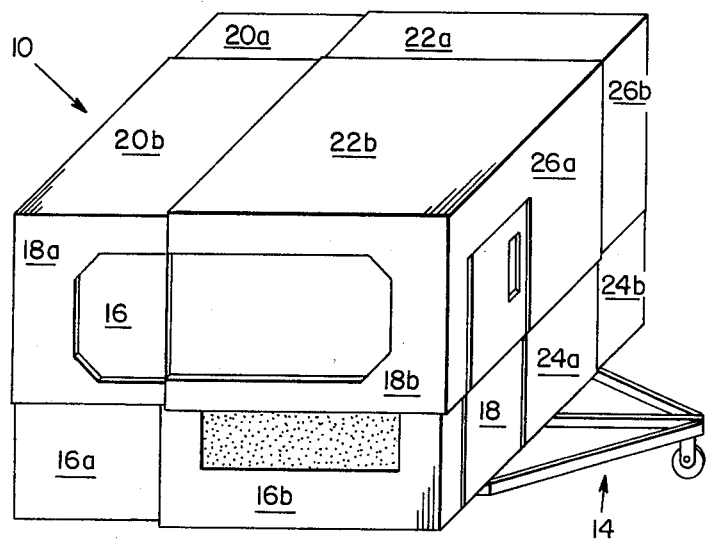
FIG. 2 is a view similar to FIG. 1 but showing the expansible enclosure in a closed position.

The enclosure 10 is shown in a contracted position in FIG. 2. Although wheels are not shown under the chassis of the enclosure, in this position the enclosure could very easily be moved from place to place, including through city streets. FIG. 2 shows that the interfitting upper sidewall panels 18a and 18b have moved down past the lower sidewall sections 16a and 16b. Also, panels 18b and 16b have moved past panels 18a and 16a, respectively, as the expansible enclosure had achieved a contracted configuration. Further, FIG. 2 shows that end panels 26a and 26b have moved down over end panels 24a and 24b, respectively, as have panels 26a and 24a moved past panels 26b and 24b, respectively. Correspondingly, panels 22a and 22b of the second top section have moved past panels 20a and 20b, respectively, of the first top section. In addition, panels 20b and 22b have moved past panels 20a and 22a, respectively. Although wall panels are not required, when the invention is used as a camper, display booth, etc., the panels can be opaque, translucent or transparent. Any suitable material could be used such as plastics, metals, wood, fibrous materials, etc. The choice of an appropriate material for the outer panels is within the skill of the art.

Figure 3:
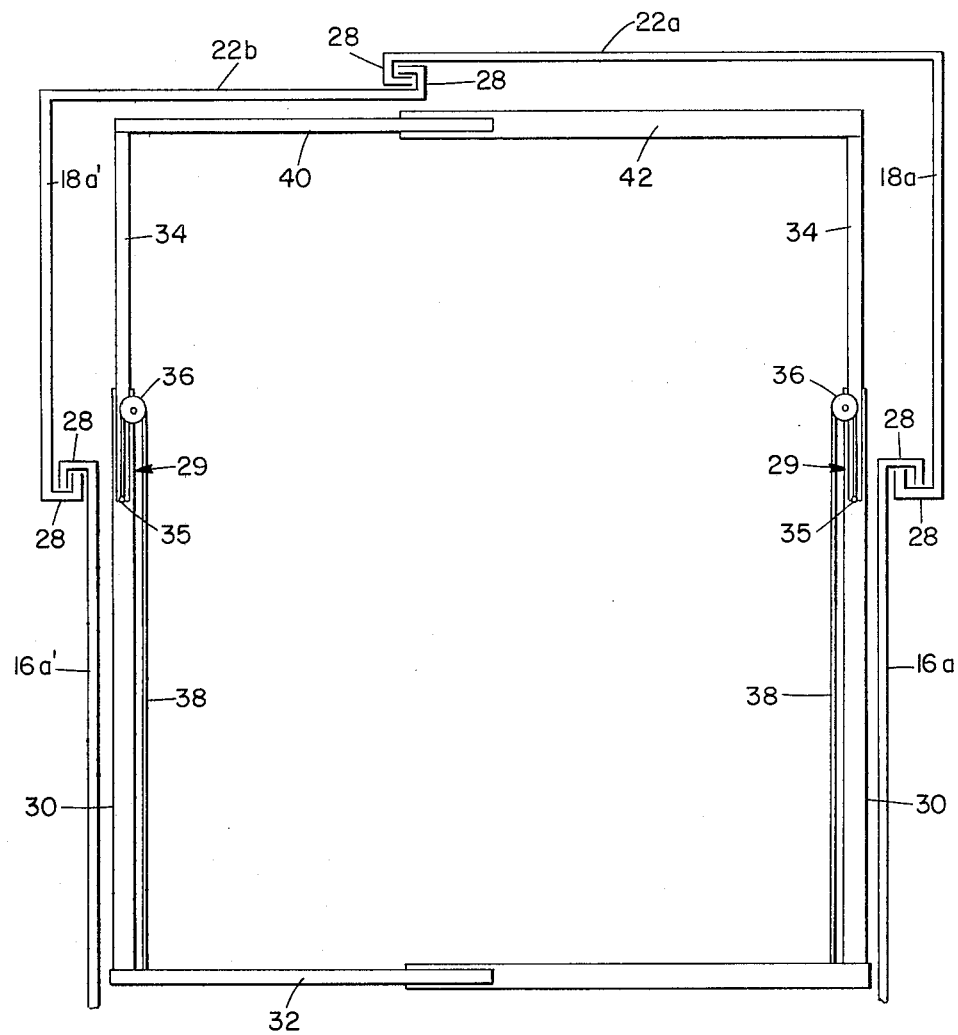
FIG. 3 is a sectional view along the line 3—3 of FIG. 1 showing the interfitting wall sections and a portion of the cable assemblies.

The means for moving the interfitting wall panels past each other is shown in FIG. 3. FIG. 3 shows the section of the expansible apparatus along the line 3—3 of FIG. 1. The enclosure is shown in the fully extended position wherein, sidewall panel 18a is shown fully extended upwardly along sidewall panel 16a. The corresponding sidewall panels on the other side of the enclosure are 16a and 18a. The roof section 22a is shown fully extended along roof section 22b. Each of the interfitting wall and roof panels have U-shaped end portions 28 which in the fully extended position interlock with corresponding end portions 28 of the adjacent wall or roof panel. The U-shaped end portions 28 not only provide protection against wind debris and outside elements but also assure that the integrity of the expansible enclosure will be maintained, especially when the expansible enclosure is fully expanded. In the embodiment of the invention shown in FIG. 3, telescoping frame means 29 includes longitudinal tube member 30, shown attached to the base member 32 of the apparatus.

Figure 7:
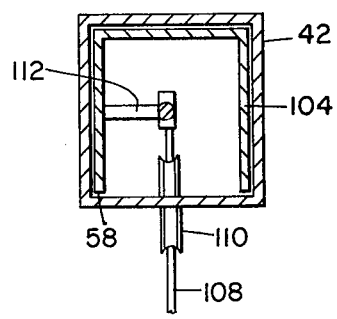
FIG. 7 is a cross-sectional view of the tube member and interior structural member assembly along the line 7—7 of FIG. 6.

In this embodiment, tube member 30 has a square cross section although other cross sectional shapes such as circular and rectangular could be used. Longitudinal interior structural member 34 telescopically extends down into tube member 30. Interior structural member 34 in this embodiment has a C-shaped cross section as shown in FIG. 7. Pulley 36 is shown in FIG. 3 rotatably mounted in an opening in the wall of tube member 30 such that it extends into the interior of longitudinal interior structural member 34 which has a C-shaped cross section to accommodate pulley 36. Cable 38 is shown attached to the lower end of interior structural member 34 at point 35 and extending up through and within interior structural member 34 around cable 36 and outside of tube member 30 toward another pulley, not shown, within base member 32. Movement of cable 38 in either direction will raise or lower the top panels or roof and corresponding upper sidewall panels of the enclosure such as 18a, 18b, 18a', 18b', 26a and 26b. Although not shown in this drawing, the mechanism for extending the apparatus widthwise is contained in the base of the enclosure. Therefore, no cables per se are provided for movement of the top panels or roof section in this embodiment. Nevertheless, for widthwise movement longitudinal interior structural member 40 of the roof section moves telescopically into and out of longitudinal tube member 42 of the roof section to in turn move interfitting roof members 22a and 22b to expand or contract the enclosure.

Figure 4:
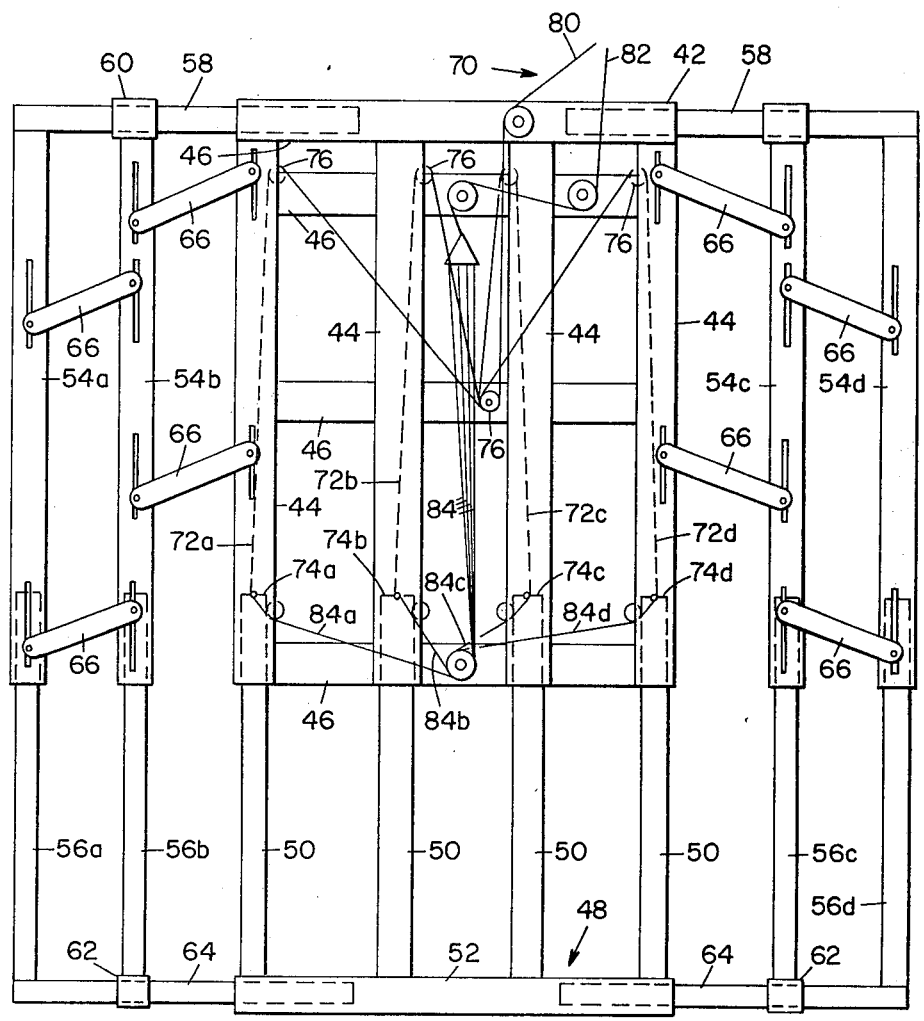
FIG. 4 is a top plan view of the chassis, showing a floor extended in two directions with the cable assemblies used to vary the dimensions of the floor in a longitudinal direction.

The base of the expansible enclosure of the embodiment of FIG. 1 is shown in FIG. 4. The first base section 42 consists of a plurality of spaced apart longitudinal tube members 44. In the embodiment of FIG. 4, each of the spaced apart tube members 44 is substantially parallel to each other spaced apart tube member, and are attached by cross members 46. In FIG. 4 each of the cross members 46 is attached to the undersides of the tube members 44. A second base section 48 consists of spaced apart interior structural members 50, which are adapted to move telescopically into and out of the corresponding spaced apart longitudinal tube members 44 for the first base section. Cross member 52 is connected to the ends of each of the interior structural members 50 to provide rigidity and support. In the embodiment of FIG. 4 each of the spaced apart tube members 44 has a square cross section and each of the interior structural members 50 has a C-shaped cross section and is adapted to integrally move into and out of the corresponding tube members. Base section 42 also includes extendable spaced apart longitudinal tube members 54, which are parallel to stationary tube members 44, and which have extendable interior structural members 56 which telescopically extend into and out of corresponding tube members 54. Extendable tube members 54 are maintained in substantially parallel position to each other and to tube members 44 by rigid members 58 which are attached to an end of each of the tube members 54 and which telescopically extends into an open member of base section 42. Extendable tube members 54 are adapted to move along member 58 by being attached to collars 60 which slide along members 58 on the base section as the floor is expanded. Extendable interior structural members 56 are also adapted to extend by being attached to collars 62 which move along members 64 wherein members 64 move telescopically into and out of member 48 of the second base section. Any desired spacing of the tube members and interior structural members of the base section can be obtained by appropriate design of the spacers 66. Spacers 66, in this embodiment, are rigid members attached by ball and race mechanism to tube members 54 to maintain the substantially parallel spaced apart relationship of tube member 54 and the structural rigidity of the enclosure floor.

Figure 6:
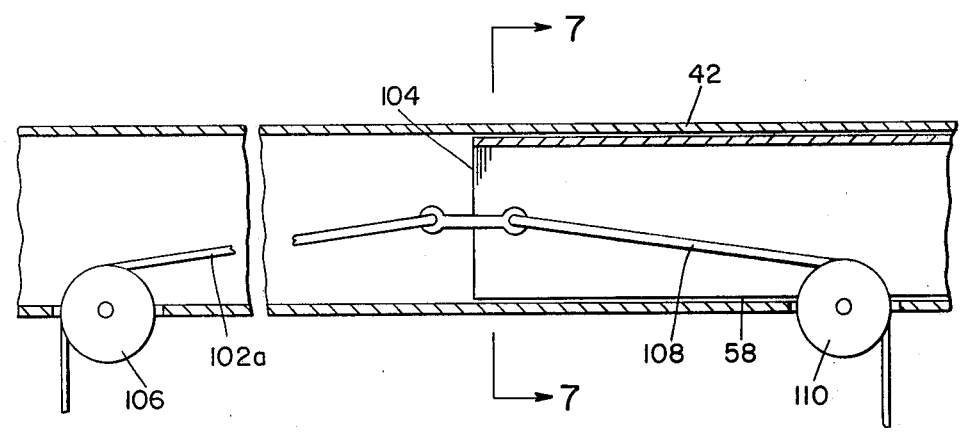
FIG. 6 is a fragmentary sectional view of a tube member and corresponding interior structural member with corresponding cable and pulley assemblies.

In the embodiment of FIG. 4 a cable system is shown for altering the dimensions of the base section in one direction. FIG. 4 shows the base section in an essentially extended lengthwise direction. Cable system 70 would be used to decrease the dimensions of the expandable enclosure, i.e., to close the base section. Cable system 70 includes cables 72a, 72b, 72c and 72d which are attached to the interior ends 74a, 74b, 74c and 74d of interior structural members 50 to retract the interior structural members 50 into tubular members 44. Each of the cables 72 moves through the interior of a corresponding tube member 44 and around a pulley 76, such as is shown in FIG. 6, toward and around a central pulley 78 mounted on one of the interior cross members 46 and subsequently attached to cable 80 of cable system 70, which in this embodiment is subsequently attached to a power driven winch, located other than in the floor of the enclosure.

The base section can be opened using cable system 82 which includes a series of cables 84 which move past a series of pulleys into connection with and at the end of the interior end 74 of each of the interior structural members 50.

Figure 5:
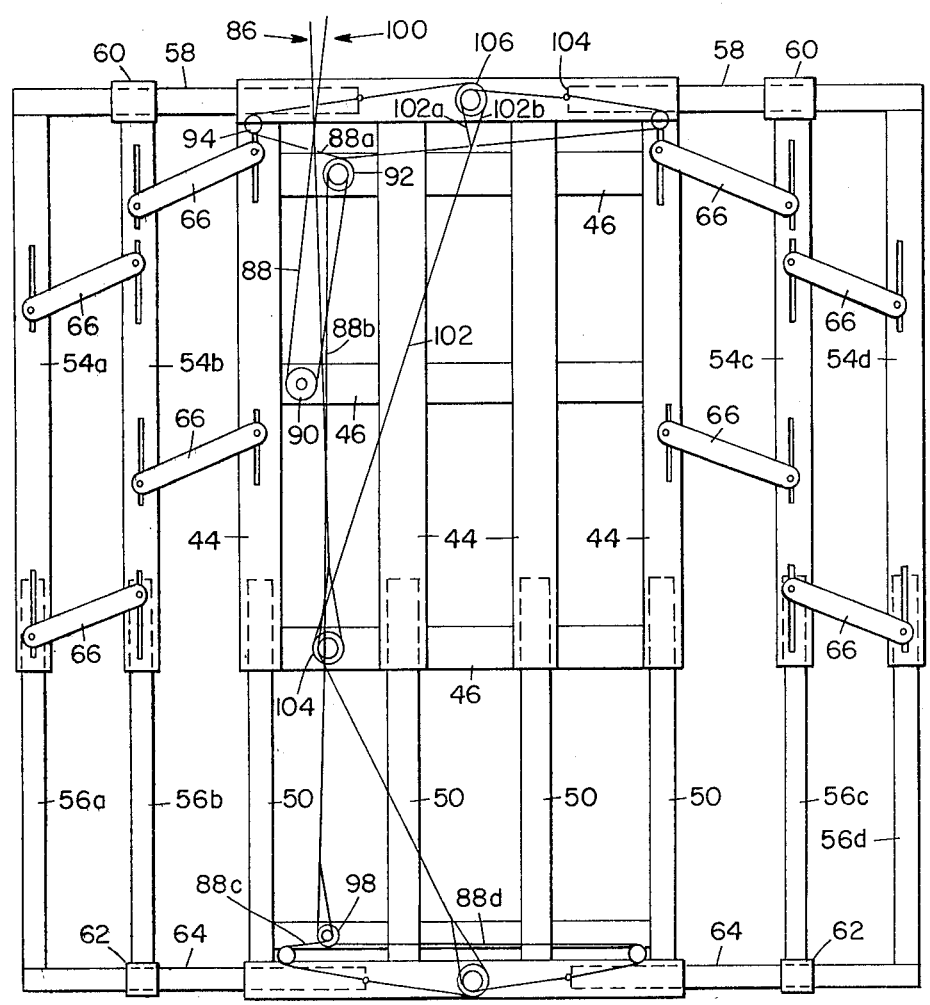
FIG. 5 is a top plan view of the chassis showing the floor extended in two directions with the cable assemblies used to open and close the floor in a width wise direction.

The cable systems for opening and closing the expansible enclosure apparatus in a widthwise direction are shown in FIG. 5. The apparatus can be opened by cable system 86. Cable 88 of cable system 86 moves around pulley 90 which is attached to cross member 46 and around double pulley 92 where it separates into cables 88a and 88b. Cable 88a then passes through tube member 44 around pulley 94 and into attachment with the end 96 of end member 58. When cable 88 is drawn by the gear driven winch (not shown) to open the base section, it will cause cable 88a to pull end member 58 telescopically out of base section 42. Cable 88b, which also moves around double pulley 92, extends along the base section to double pulley 98. At double pulley 98, cable 88b splits into cables 88c and 88d. Cables 88c and 88d then move past pulleys into cross member 52 into attachment with the end of end members 64, such as is shown in the detail of FIG. 6.

Cable system 100 is used to close the base of the enclosure in a widthwise direction. As shown in FIG. 5, the cables of cable system 100 also move across pulleys mounted on various cross members of the base section and are subsequently attached to ends of end members, such as end 96 of end member 58, which allows the cable system 100 to retract the base section extendable members. For example, cable 102 of cable system 100 moves past pulley 104 and past pulley 106 which splits into cables 102a and 102b. Cable 102a is attached to end 104 of telescoping end member 58. The details of this structure are shown in FIG. 6 wherein cable 102a is shown passing over pulley 106 into attachment at end 104 of telescoping end member 58. Cable 108 shown in FIG. 6 is a part of cable system 86 used to open the base section of the expansible enclosure apparatus. FIG. 7 shows in cross section tubular end member 42 and the C-shaped cross section of end member 58. Also shown is clamp 112 which is used to attach cables 108 and 102a to end 104 of end member 58.

Figure 8:
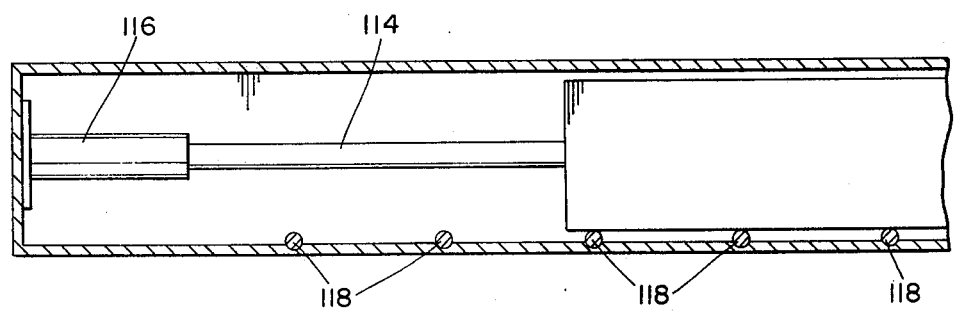
FIG. 8 shows an alternative embodiment of the invention wherein hydraulic means is used to move the interior structural member relative to the tube member.

Although FIGS. 4 and 5 have shown in detail how cable systems can be used to expand and contract the expansible enclosure apparatus of the invention, any suitable means may be utilized. For example, as illustrated in FIG. 8, hydraulic pistons and cylinders, designated 114 and 116, respectively, are utilized to expand and contract the apparatus. As shown in FIG. 8, the hydraulic piston 114 would be attached to an end of one of the interior structural members located inside one of the tube members of the apparatus. The interior structural member would then ride on rollers 118, which would allow contraction and expansion of various members of the apparatus of this invention. Alternatively, a hydraulic piston could comprise an interior structural member.

No detailed description is given of the hydraulic piston and cylinder arrangement illustrated, other than that shown in FIG. 8, as any desired hydraulic system may be utilized. Parts for such a system are readily available on the market, and the technology for incorporating same are well known. Furthermore the means for extending or contracting any of the sections of the enclosure including the base section, the lower sidewalls, the upper sidewalls, or the roof section may be provided by any suitable means, for example, by mechanical means, such as pulleys, levers, cranks, and the like, or by pneumatic or vacuum means or by the utilization of electric motors. Installation and operation of all of these motive devices are well known and easily adaptable to the apparatus of this invention.

In the instant invention, the term expansible includes the ability to expand and contract. The invention allows the apparatus to adjust to a variety of dimensions to satisfy various needs. The flexibility associated with the invention and the structural rigidity provided by square cross sectioned longitudinal tube members and C-shaped cross sectioned longitudinal interior structural members in the preferred embodiment make the invention adaptable to a number of uses. For example, in addition to the uses already mentioned, the invention can be adapted to display counters for various types of merchandise to be displayed in department stores, supermarkets, boutiques, etc. The display counters could be adjusted to the desired size and shape, with overlapping glass panels used along the outer surfaces. The telescoping frame means, including tube members and interior structural members, could conveniently be made of chrome-plated metal or some other decorative material. Depending on advertising and display needs, the counter could quickly be altered in dimensions to conform to the user's needs or taste.

Although the preferred embodiment utilizes a plurality of telescoping frame means for rigidity, in each side, e.g., the floor or base section, only one telescoping frame means is required for movement in any desired direction. Therefore, for two dimensional expansions, two telescoping frame means are required. Three-dimensional expansion and contraction requires minimally three telescoping frame means, moving in mutually perpendicular directions, with each telescoping frame means connected to substantially parallel opposed sides. For example, the floor or base of the inventive apparatus could have a telescoping frame means along only one side with structural members known to the art providing additional support. Nevertheless, usually a plurality of telescoping frame means is used preferably in the base or floor, along each of the vertical corners and, as desired, in the roof, such as would be required for a three-dimensionally expansible enclosure.

Suitable latches or locking means can be provided to maintain the various sections releasably locked into position in both the contracted and expanded mode. For example, if cable means are employed, then locking can be provided with the gear-driven winches, whether manually or motor driven. It should be understood that any desired latching means may be utilized.

Although FIGS. 1 and 2 show the invention as capable of being towed in addition to being used in a stationary application, the invention can have self-contained motive means. The power source for the wheels could also be used to power the telescoping frame means, if desired.

It is to be understood that the form of this invention herewith shown and described is to be taken as a preferred example of the same, and that this invention is not to be limited to the exact arrangement of parts shown in the accompanying drawings or described in the specification as various changes in the details of construction as to shape, size and arrangement of parts may be resorted to without departing from the spirit of the invention, the scope of the novel concepts thereof, or the scope of the claims.

What I claim and desire to protect by Letters Patent is:

1. An expansible enclosure comprising:
   a box-like structure having six sides interconnected at their respective peripheries, said sides arranged in opposed pairs, four of said sides being expansible, two opposed sides being fixed in lateral dimensions; and
   at least two telescoping frame means, said frame means being perpendicular to each other, and each of said frames means being integral and co-planar with an expansible side of said box-like structure, each of said frame means interconnecting a pair of opposed sides, each of said frame means telescoping to move their respective pairs of opposed sides, interconnected by said frame means, toward and away from each other for varying the dimensions of said enclosure in two dimensions, wherein each of said frame means includes a substantially longitudinal tube member and a complimentary substantially longitudinal interior structural member telescopically movable relative to said tube member and translational means for telescopically moving said interior structural member relative to said tube member varying the dimensions of said enclosure.

2. The enclosure of claim 1 wherein each of said expansible sides includes a plurality of overlapping panels.

3. The enclosure of claim 1 wherein each of said expansible sides includes a plurality of substantially interfitting overlapping co-planar panels.

4. The enclosure of claim 3 wherein each of said tube members has a substantially square cross-section, each of said interior structural members has a substantially C-shaped cross-section and said translational means includes cable means operative partially with pulleys wherein said pulleys partially extend into the interior of said tube members and said interior structural members to permit said cable means being connected to said interior structure members to extend longitudinally within said tube members for telescopically moving said interior structural members relative to said tube members.

5. An expansible enclosure comprising a box-like structure having six sides interconnected at their respective peripheries, said sides arranged in opposed pairs, each of said sides being expansible; and
   at least three telescoping frame means, each of said frame means being perpendicular to each other, and each of said frame means being integral and co-planar with an expansible side of said box-like structure, each of said frame means interconnecting a pair of opposed sides, each of said frame means telescoping to move their respective pair of opposed sides, interconnected by said frame means, toward and away from each other for varying the dimensions of said enclosure in three dimensions, wherein each of said frame means includes a substantially longitudinal tube member and a complimentary substantially longitudinal interior structural member, said interior structural member, telescopically movable relative to said tube member and translational means for telescopically moving said interior structural member relative to said tube member for varying the dimensions of said enclosure.

6. The enclosure of claim 5 wherein each of said expansible sides includes a plurality of overlapping panels.

7. The enclosure of claim 5 wherein each of said expansible sides includes a plurality of substantially interfitting overlapping co-planar panels.

8. The enclosure of claim 7 wherein each of said tube members has a substantially square cross-section, each of said interior structural members has a substantially C-shaped cross-section and said translational means includes cable means operative partially with pulleys wherein said pulleys partially extend into the interior of said tube members to permit said cable means, being connected to said interior structural members, to extend longitudinally within said tube members for telescopically moving said interior structural members relative to said tube members.

* * * * *